May 25, 1965 G. KLINGEMANN ETAL 3,185,199
TREAD STRUCTURE FOR PNEUMATIC VEHICLE TIRES
Filed Feb. 20, 1963
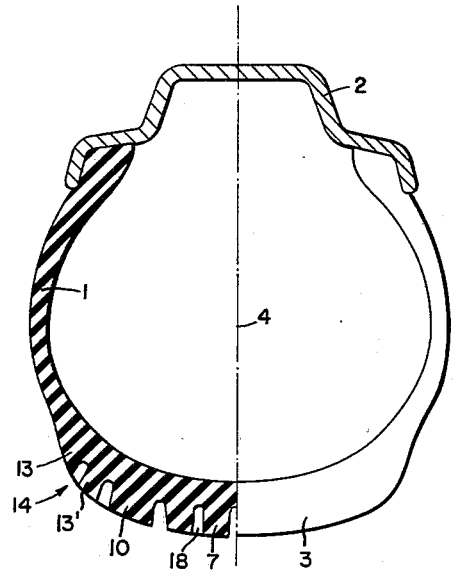
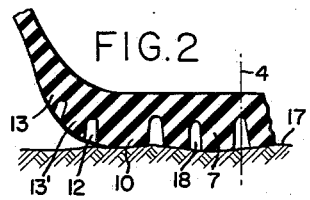
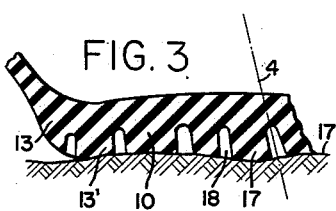
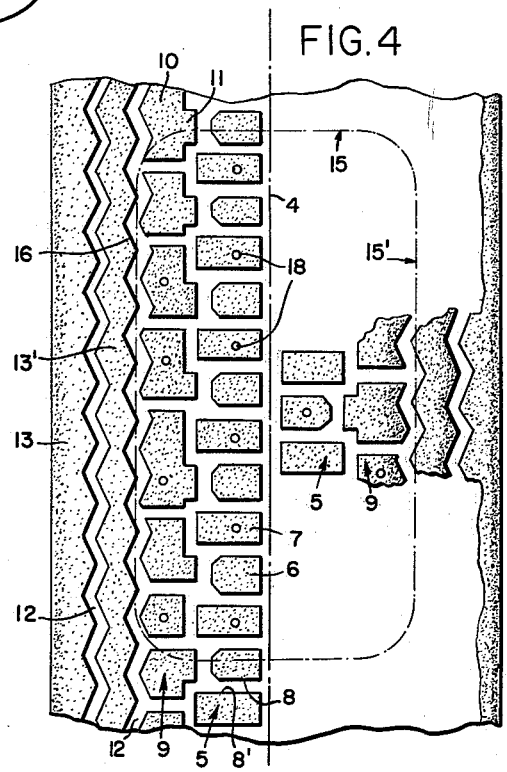
INVENTORS
GEORG KLINGEMANN
FRIEDEL KLÖHN
BY United States Patent Office 3,185,199
Patented May 25, 1965

3,185,199
TREAD STRUCTURE FOR PNEUMATIC
VEHICLE TIRES
Georg Klingemann, Hannover-Herrenhausen, and Friedel Klöhn, Hannover, Germany, assignors to Continental Gummi-Werke, Aktiengesellschaft, Hannover, Germany
Filed Feb. 20, 1963, Ser. No. 259,972
Claims priority, application Germany, Feb. 22, 1962,
C 26,295
4 Claims. (Cl. 152—209)

The present invention relates to a tread structure for pneumatic vehicle tires which is suitable for winter driving and comprises a tread strip having circumferential ribs and rows of blocks while the circumferential ribs are arranged at the lateral tread marginal portions whereas the longer edges of the blocks which have an approximately rectangular plan view extend in a direction transverse or approximately transverse to the circumferential direction of the tire.

With heretofore known tires of this design, the circumferential ribs continuously contact the road. This is disadvantageous inasmuch as the circumferential ribs partially counteract and eliminate the advantageous effect of the blocks and in addition thereto have a skid-like effect which aids the skidding tendency.

It is, therefore, an object of the present invention to provide a tread structure for pneumatic vehicle tires, which will overcome the above mentioned drawbacks.

It is also an object of the present invention to provide a tread structure for pneumatic vehicle tires which is characterized in that during normal operation the marginal tread area with the ribs thereon is not in contact with the road whereas when driving through curves or when the tire surface is distorted in view of lateral forces acting thereon, also the marginal tread area with the ribs thereon will contact the road.

These and other objects and advantages of the invention will appear more clearly from the following specification in connection with the accompanying drawing, in which:

FIG. 1 is a partial section through a tire according to the present invention which is inflated but under no load, i.e. does not contact the road.

FIG. 2 shows a portion of the tire of FIG. 1 while under normal operational and axle load and contacting the road.

FIG. 3 shows the tire portion illustrated in FIG. 2 but under conditions in which the ground contacting surface of the tire is distorted for instance when driving over a laterally inclined road.

FIG. 4 is a top view of a portion of the tread structure of the tire according to FIGS. 1 to 3 with the dot-dash line indicated therein designating the respective ground or road contacting area of the tire.

The tire according to the present invention is characterized primarily in that the circumferential ribs which at both sides of the tread surface form rounded surfaces or shoulders, are so arranged that under normal conditions of operation merely the blocks or at best the blocks and the adjacent edges of the circumferential ribs contact the road. By "normal conditions of operation" is understood a situation in which the vehicle moves over a straight road, i.e. in which no steering wheel turn or a distortion of the tire bodies is effected, and in which the tire chamber is under the prescribed tire pressure while the wheels are under the prescribed axle load.

Under these conditions, practically only the blocks arranged between the laterally provided circumferential ribs are effective so that the advance or grip of the tires is assured and accelerations and retardations will be possible without being harmfully affected by the circumferential ribs. If, however, for instance when turning the steering wheel, a distortion of the tire cross section occurs, the circumferential ribs at the rounded marginal portions of the tread surface will come into contact with the road so that the maintenance of the track line will be assured which is an indispensable requirement when driving at higher speeds. The disadvantageous effect of the circumferential ribs is thus eliminated when driving along a straight road, and the circumferential ribs become effective for all practical purposes only when their intended effect is desired, namely for maintaining the track line while the vehicle is not driving along a straight line. It is for this reason that a tire according to the present invention is also highly suitable for higher driving speeds and for roads differing in their road surface, for instance when the road is covered with snow or rain.

Referring now to the drawing in detail, the tire body 1, which in customary manner is provided with reinforcing inserts containing carcass (not shown), is mounted on a rim 2. The tread strip 3 has a profile which for all practical purposes is symmetrical with regard to the circumferential plane of symmetry 4.

As will be evident from the drawing, the central portion of the tread at both sides of the plane of symmetry 4 comprises a row of blocks 5 (FIG. 4) which includes blocks 6 and 7 arranged in series in circumferential direction of the tire. These blocks 6 and 7 have a substantially rectangular plan view. The longer edges 8, 8' of blocks 6 and 7 respectively extend substantially at a right angle with regard to the plane 4. However, if desired, they may also extend at another angle thereto so that they form angles up to 30° with the plane of symmetry 4. With regard to their dimensions, height, depth of the grooves, their relative arrangement and the width of the grooves, the said blocks 6 and 7 correspond to the block arrangements of mud and snow tires which are produced of substantially similar structure by all tire manufacturers.

Adjacent the two centrally arranged rows of blocks 5 there is provided on each side thereof a further row 9 of blocks 10. These blocks 10 may be designed similar to the blocks 6 and 7, but according to the specific showing in the drawing, the blocks 10 are of a contour different from the contour of blocks 6 and 7. Blocks 10 protrude in the direction toward the blocks 6 of row 5, namely substantially opposite blocks 6. These protrusions of blocks 10 are designated with the reference numeral 11. Similar to the non-uniform pitch of the blocks pertaining to the block rows 9, also the blocks 6 and 7 of the block rows 5 may have different pitch or different extensions with regard to the circumferential direction of the tire.

The marginal tread zones are formed by two circumferential ribs 13 and 13' which are of zig-zag shape or confined by a zig-zag-shaped groove 12. These circumferential ribs 13 and 13' form rounded tread zones 14 as is particularly clearly shown in FIG. 1. The laterally outwardly located edges of blocks 10 of the block rows 9 are shaped in conformity with the course of the zig-zag-shaped grooves 12.

Preferably, the circumferential ribs are designed as continuous homogeneous bands. It is, however, also possible to provide the circumferential ribs 13 and 13' with fine cuts of such a width that for all practical purposes they do not interrupt the course of the circumferential ribs 13 and 13'.

In conformity with the present invention, it is of particular importance that under normal conditions of operation, i.e. when the wheels are not turned or no lateral forces act upon the wheels, practically only the block rows 5 and 9 contact the road so that the advantageous gripping action of blocks 6, 7 and 10 will be fully effective. In the condition of operation illustrated in FIG. 2, a ground contacting surface is obtained which is more clearly shown in FIG. 4 and indicated by a dot-dash line 15. The course of the lateral ground contact line 15' clearly indicates that of the ribs 13, 13' merely the ribs 13' adjacent the plane of symmetry 4 contact the road 17 by means of their edges 16 protruding in the direction toward the said plane of symmetry 4. Such a contact is, however, not an indispensable requirement. In other words, in the condition of operation illustrated in FIG. 2, the partial gripping action of the marginal portions or edges of ribs 13' adjacent the plane of symmetry 4 is not necessary. When the tire surface is distorted, for instance when the vehicle passes over a road which is inclined in the direction transverse to the longitudinal direction of the road, the tire body 1 will be distorted in the manner illustrated in FIG. 3 so that in this instance also the circumferential ribs 13 will contact the road 17. As a result thereof, the said circumferential ribs 13 take over the guiding of the wheel and assure the desired course of the vehicle for instance in conformity with the turning angle of the steering wheel.

In order to assure the effect of blocks 6, 7 and 10 also over hard roads, i.e. over roads which are not snow covered, blocks 6, 7 and 10 may additionally be provided with small bores 18 extending substantially perpendicular to the tread surface, and preferably distributed in a non-uniform manner over the tire circumference. Such an arrangement brings about a very advantageous gripping effect inasmuch as the holes form more or less suction cups. These bores 18 preferably have a relatively small diameter, for instance of from 2 to 3 millimeters.

It is, of course, to be understood that the present invention is, by no means, limited to the particular construction shown in the drawing but also comprises any modifications within the scope of the appended claims.

What we claim is:

1. A pneumatic tire having a tread strip provided with circumferential ribs arranged at the marginal portions only of said tread strip and separated from each other by circumferential groove means, said ribs having a width equalling a multiple of the width of said groove means so as to be relatively stiff, said tread strip also being provided with circumferentially extending rows of blocks arranged between the innermost ones of said ribs and separated from each other by grooves extending in the direction toward the respective adjacent row of blocks, at least some of said blocks differing in length from each other and having their longitudinal extension substantially transverse to the circumferential direction of said tire, said circumferential ribs forming marginal tread surfaces of rounded cross-sectional contour with the curvature thereof in a direction transverse to the direction of rotation of said tire, said circumferential ribs being so arranged that under normal conditions of operation of the tire at least the major surface portion of said ribs will at all times throughout each complete revolution of the tire be set back with regard to the road contacting surface of said tire so that under normal conditions of operation of the tire, the said ribs will be free from contact with the road surface over which the tire moves, said ribs being adapted to engage said road surface in response to said tire driving over a surface inclined in a direction transverse to the driving direction of the tire.

2. A pneumatic tire according to claim 1, in which the blocks of some rows of blocks have their longitudinal extension in the direction of rotation of said tire.

3. A pneumatic tire according to claim 1, in which said blocks are provided with cavities extending in a direction substantially perpendicular to the respective outer block surface forming a part of the ground contacting surface of said tread strip.

4. A pneumatic tire according to claim 1, in which said blocks are provided with bores having a small diameter within the range of from 2 to 3 millimeters and having their axes substantially perpendicular to the respective outer block surface forming a part of the ground contacting surface of said tread strip.

References Cited by the Examiner
UNITED STATES PATENTS

| | | | |
|---|---|---|---|
| 2,094,636 | 10/37 | Bull | 152—209 |
| 2,655,971 | 10/53 | Gross | 152—209 X |
| 2,699,193 | 1/55 | Overman | 152—209 |
| 2,960,138 | 11/60 | Chiodo | 152—209 |

ARTHUR L. LA POINT, *Primary Examiner.*